United States Patent

[11] 3,611,181

[72] Inventors Edmund C. Lary
 Glastonbury, Conn.;
 Harvey R. Worthington, Jr., Cambridge, Mass.
[21] Appl. No. 766,408
[22] Filed Oct. 10, 1968
[45] Patented Oct. 5, 1971
[73] Assignee United Aircraft Corporation
 East Hartford, Conn.

[54] LASER DIFFRACTION GRATING COUPLING MIRROR
 2 Claims, 7 Drawing Figs.
[52] U.S. Cl. .................................................. 331/94.5, 350/162
[51] Int. Cl. .................................................. H01s 3/05
[50] Field of Search .......................................... 331/94.5

[56] References Cited
 UNITED STATES PATENTS
 3,292,102 12/1966 Byrne ........................... 331/94.5

OTHER REFERENCES
 McClellan et al., " Optical Spertia," July-August 1968, pp. 49– 52.
 Tremblay et al., " Applied Physics Letters," 15 Aug. 1966, pp. 136– 138.

Primary Examiner—Roy Lake
Assistant Examiner—Darwin R. Hostetter
Attorney—Melvin Pearson Williams ABSTRACT: A diffracting mirror having a shallow surface modulation pattern in the form of a grating is used in a laser cavity partly to sustain resonance by specular reflection and partly to divert power into an external beam by diffraction. Diffractive coupling permits the external beam to emerge without passing through the mirror, thereby avoiding certain limitations of the present art. Various embodiments provide for single or multiple external beams, for collimated or convergent beams, and for modulated beams.

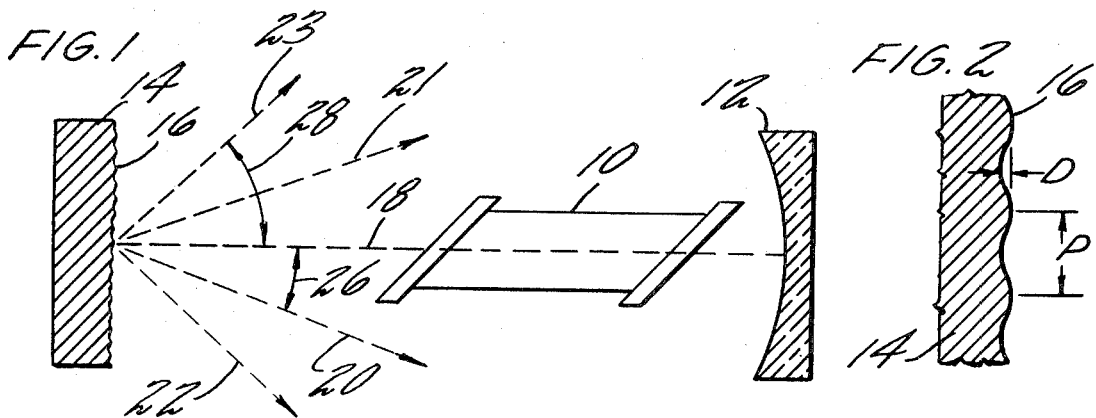
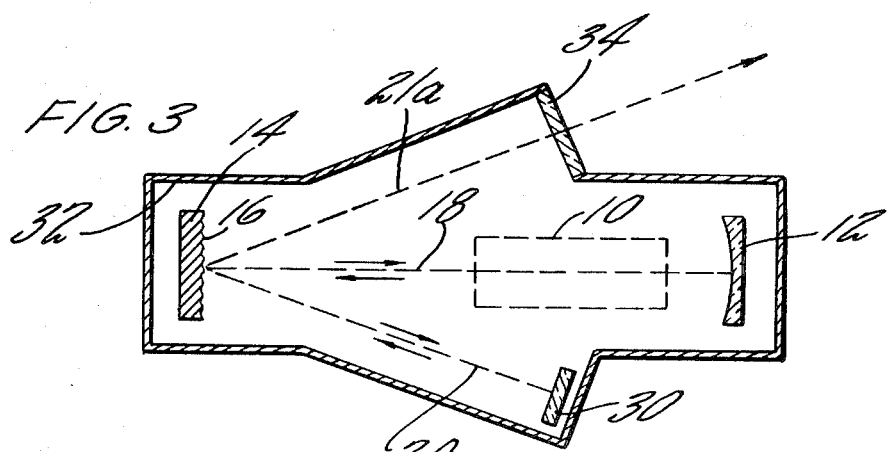
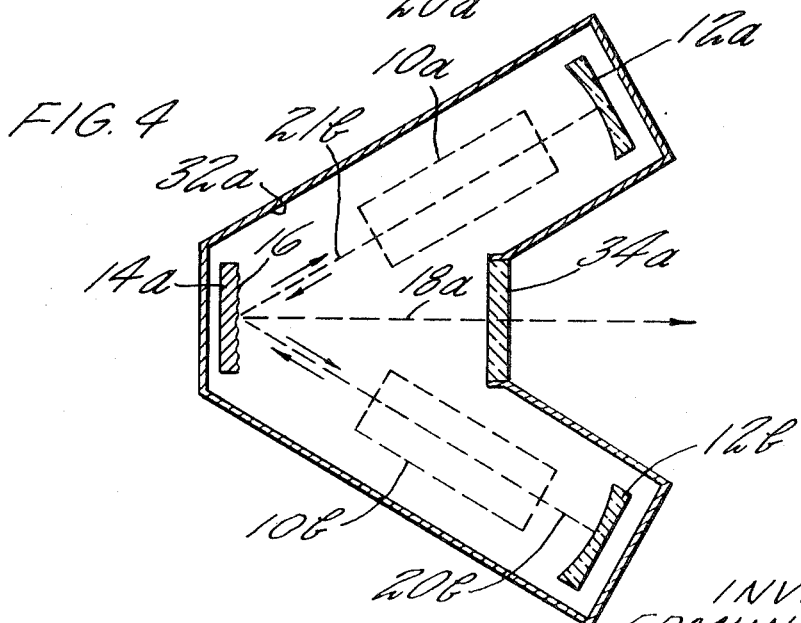
INVENTORS
EDMUND C. LARY
HARVEY R. WORTHINGTON, JR.
BY Melvin Pearson Williams
ATTORNEY

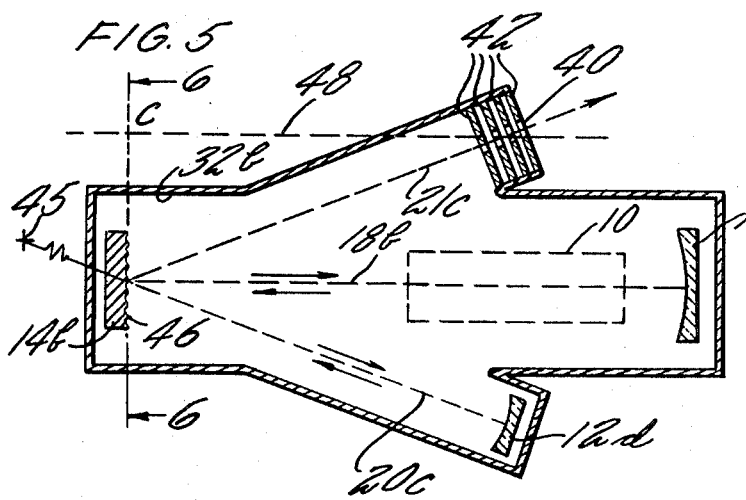
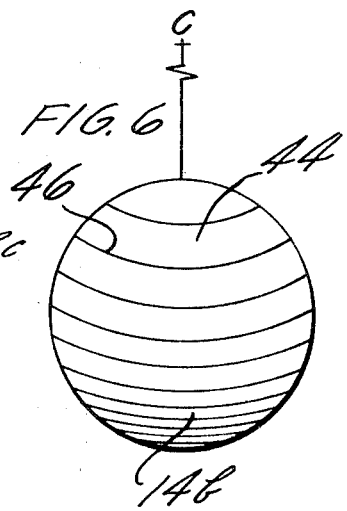
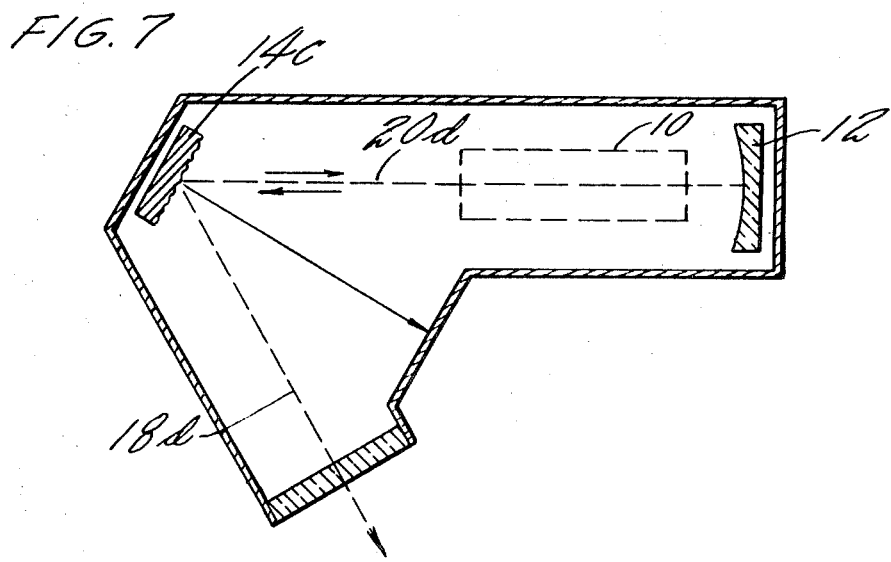

LASER DIFFRACTION GRATING COUPLING MIRROR

BACKGROUND OF THE INVENTION

1. Field of the Invention

This invention relates to laser beam output coupling, and more particularly to a diffraction coupling mirror for the laser.

2. Description of the Prior Art

The most common conventional means for extracting a laser beam comprises a partially transparent mirror located at one end of the resonant optical cavity. This permits a portion of the incident power to be transmitted through the mirror and out of the cavity while at the same time a portion of the power is reflected so as to sustain coherent stimulated emission of electromagnetic energy suitable for amplification and/or oscillation. However, partially transparent mirrors are nearly impossible to achieve in lasers operating in the infrared region of the spectrum, and such mirrors are destroyed by overheating. Another conventional practice is to extract laser power through a small hole in one of the mirrors. In that case, the strength of the resonating beam may remain at a safe level only so long as the beam is properly centered upon the coupling hole. Otherwise, the power drain decreases, the strength of the resonating beam increases, and the surface of the mirror is damaged by overheating. Additionally, the hole induces undesirable modes of resonance, decreasing the efficiency and impairing the collimation of the output beam.

SUMMARY OF THE INVENTION

The object of the present invention is to provide improved power coupling in lasers, and the elimination of heating problems in output coupling devices and mirrors.

According to the present invention, output coupling is achieved by means of a coupling mirror having a reflective grating pattern thereon. In accordance further with the present invention, the coupling mirror is one of the two mirrors that form the resonant cavity, and its general shape is conventional. The surface modulation pattern has a very low relief, so that most of incident power continues to undergo specular reflection. A small fraction of the incident power, however, is diverted into two or more diffracted beams. The directions and the focal properties of the diffracted beams are determined by the form and spacing of the grating lines. The foregoing and other objects, features and advantages of the present invention will become more apparent in the light of the following detailed description of preferred embodiments thereof, as illustrated in the accompanying drawings.

BRIEF DESCRIPTION OF THE DRAWINGS

FIG. 1 is a simplified schematic diagram of a laser incorporating the principles of the present invention, illustrating relationships which obtain herein;

FIG. 2 is a simplified, partially broken away, cross section of a sinusoidal grating diffraction mirror in accordance with the principles of the present invention;

FIG. 3 is a simplified schematic diagram of another embodiment of the present invention illustrating a high-Q cavity with first-order diffraction coupling;

FIG. 4 is a simplified schematic diagram of another embodiment of the present invention in which a pair of lasers act coherently to produce a single output beam.

FIG. 5 illustrates a further embodiment of the present invention utilizing a diffraction mirror having a Fresnel pattern that produces a focused output beam.

FIG. 6 is an illustration of one form of Fresnel pattern mirror suitable for use in the embodiment of FIG. 5; and FIG. 7 is a simplified schematic diagram of another embodiment of the present invention illustrating a laser having a low-Q cavity with zeroeth order coupling and first order feedback.

DESCRIPTION OF THE PREFERRED EMBODIMENT

A relatively simple embodiment of the present invention is illustrated in FIGS. 1 and 2 wherein a laser medium 10 is positioned between a pair of mirrors 12, 14 in a conventional manner. The laser medium 10 may comprise any well-known form of solid, gaseous or liquid laser, of which there are a large number available in the art. The mirror 12 is a concave spherical mirror and the mirror 14 is a planar mirror having a modulation pattern thereon. The modulation pattern may take a variety of forms, such as sawtooth, sinusoidal, blazed, or step, however, the reflecting surface of the mirror 14 may preferably comprise a simple sinusoidal grating pattern, as illustrated in FIG. 2. In accordance with conventional laser technology, the reflecting plane 16 of the mirror 14 is normal to the optical axis of the concave mirror 12, and the axial distance directly between the reflecting surfaces of the mirrors 12, 14 is chosen to be less than the radius of curvature of the concavity of the mirror 12. If there were no grating pattern on the reflective surface 16 of the plane mirror 14, all of the electromagnetic energy would lie within a resonating beam along the optical axis, and no other beams would exist. Because of the modulation pattern on the surface of the mirror 14, part of an incident resonating beam 18 is diffracted by the grating of the surface 16 and emerges in the form of a plurality of well-defined beams 20–23 at determinable angles with respect to the optical axis. Control over the topography of the modulation pattern on the reflective surface 16 of the mirror 14 will provide selection of the particular deflected beams generated. But the groove shape is not too significant when the grooves are quite shallow. When the depth of surface modulation from crest to trough (D, FIG. 2) is small compared to the wavelength of the radiation, then the effect of the modulation pattern on the surface 16 is small. Specifically, if the depth of modulation is substantially equal to 0.032 wavelength, the portion of the incident power that appears in each of the first order diffracted beams 20, 21 is only about 1 percent. The portion of incident power that appears in each of the second order diffracted beams 22, 23 is negligible (something on the order of 0.0025 percent). If the grating period P, FIG. 2 is such as to produce even higher diffracted orders, the percentage of incident power that appears in such orders is even less than that for the second order, and therefore may be ignored. Thus, in the example under discussion, the bulk of the incident power (substantially 98 percent of it) undergoes specular reflection and thus serves to sustain the resonance.

In the embodiment illustrated in FIg. 1, two first order beams, each having essentially 1 percent of the incident power therein, may readily be generated so as to permit extraction of this power in a manner which in no way interfers with the resonance of the optical cavity. It should be noted that this does not hamper the power-generating capability of the laser; on the contrary, this permits operating lasers at higher powers than has heretofore been possible, as far as the optics and output coupling are concerned. Thus, if the output power of the laser were to be 100 watts in each of the first order mode beams 20,21, then there would be essentially 10,000 watts within the optical cavity, but approximately 9,800 watts would be reactive in nature. This is similar to the case of a tuned electrical circuit wherein the amount of power coupled through the circuit is much less than the total power, including reactive power, within the circuit itself. However, this reactive power does not incur any drain in the power generating capability of the laser itself. If a gas laser is involved, then the amount of gas utilized, electrical power supplied or heat sources used, or the flow rate of a chemical pumping medium would be chosen so as to supply the output power, and would not have to be capable of sustaining the reactive power. Thus, a coupling factor of 1 percent is perfectly adequate in a laser, and in any case this factor may be chosen at the optimum value for a given application. Although a reflecting grating (such as that illustrated in FIGS. 1 and 2) will, in principle, respond differently to waves having different planes of polarization, when the degree of surface modulation is very small (as in the above example), the polarization effect of the grating is negligible. In the preferred embodiments of this invention, the degree of modulation is very small and the diffracting mirrors therefore have no significant effect on the polarization of the beams.

The characteristics of a laser employing the present invention, as illustrated in the embodiment of FIGS. 1 and 2, can be determined from simple mathematical formulas. Given a spacial period P of the diffraction grating (FIG. 2), then the angle of diffraction $\theta_n$ for the beam or beams of order $n$ is as follows:

$$\sin \theta_n = n\lambda/P.$$

In the example above, if the period $P$ is assumed to be equal to three times the wavelength $\lambda$, the first order mode angle 26 will be 19.5°, and the second order mode angle 28 will be 41.8°; the third order beam (not shown) will emerge at 90°.

The beam intensity for various diffractive beams of any given order are expressed by Bessel coefficients of the corresponding order. The intensity for a diffracted beam of order $n$ is proportional to $J_n^2(2\pi P/\lambda)$. In the above example, the quantity $(2\pi P/\lambda)$ is equal to 0.2, and therefore the specular reflection has a relative intensity $J_0^2(0.20)=0.98$ and the first order beams have relative intensities $J_1^2(0.20)=0.010$. The expression for relative beam intensity becomes more complicated when the quantity $(2\pi D/\lambda)$ is large, but this is not generally pertinent to the present invention. It is not necessary to have a truly sinusoidal waveform for the surface modulation; any waveform of that general shape will serve. In fact, in some applications a square wave grating may be preferred. In a square-wave grating, the depth of modulation could be less by a factor of $\pi/4$ than that of the corresponding sinusoidal grating. For example, a square-wave grating comparable to the sinusoid in FIg. 2 would have a depth of 0.025 wavelengths instead of 0.032 wavelengths, it would give 97.7 percent reflection in the zero-order beam, 1 percent each in the first-order beams, practically none in the second-order, and 0.1 percent each in the third-order beams. If the grating period (P) were made somewhat smaller than 3 wavelengths, the third-order beam could not propagate at all.

The embodiment of the invention illustrated in FIGS. 1 and 2 and described above provides two first-order diffractive beams. Most utilizations will desire all of the output in a single beam. In order to achieve this, the embodiment illustrated in FIG. 3, may include an auxiliary mirror 30, of planar configuration, which returns the first-order beam 20a to the diffraction mirror 14, where a second reflection of the power takes place into the output beam 21a.

FIG. 3 also illustrates that an operating laser in accordance with the present invention would normally be enclosed within a suitable envelope 32, and a transparent window 34 would be provided as an exit port for the useful laser output beam.

FIG. 4 illustrates an arrangement whereby a "folded" laser system may be provided, utilizing two concave, spherical mirrors and one plane mirror with a simple sinusoidal surface grating. In FIg. 4, a pair of concave spherical mirrors 12a, 12b are located at an angle with respect to the diffraction mirror 14a, each including a laser medium in the optical path at an angle of 30° with respect to the axis of the diffraction mirror 14. The output beam 18a has 1 percent of the power of beam 21b and 1 percent of the power of beam 20b or 1 percent of the total power therein. The enclosure 32a and exit 34a are modified accordingly so as to accommodate this configuration. This laser operates in a fashion similar to the embodiments of FIGS. 1-3, except that the period (P) of the surface modulation of the diffracting mirror 14 is 2 wavelengths instead of 3. A single beam emerges with 1 percent of the combined power of the two incident beams, for example. It is believed that the phases in the two arms actually tend to adjust themselves to minimize the stored energy (within beams 20b and 21b) so as to maximize the output; therefore, this operating condition may be reasonably stable. The stable position of the laser beam is in a plane that contains the centers of curvature of the two spherical mirrors and is normal to the plane mirror. The system of FIG. 4 can also use cylindrical mirrors; one with a horizontal axis and the other with a vertical axis.

The surface modulation pattern of the diffracting mirror may have many forms other than simple straight-lined grating patterns, as described with respect to FIG. 1-4 hereinbefore. In particular, circular contours that form Fresnel patterns may be used to produce a focused, diffracted beam. FIG. 5 illustrates an embodiment of the present invention utilizing a diffracting mirror of this kind. This embodiment is basically the same as that shown in FIG. 3 except that the surface modulation pattern has focal properties analogous to those of a hologram by virtue of having curved grating line with graduated spacings, as shown in FIG. 6. In FIG. 5, the diffracting mirror 14b produces two beams, one of which is a convergent beam focused at a point in the exit orifice assembly 40. The other beam is a divergent beam with a virtual source 45 behind the plane of the diffracting mirror 14b at a point which is a mirror image of the focal point of the said convergent beam with respect to the plane of the diffracting mirror 14b. This beam configuration will be recognized by those skilled in the art as the familiar configuration obtained from a Fresnel hologram pattern. The divergent beam is intercepted by the concave spherical mirror 12d which focuses the divergent beam upon its own virtual source point 45, causing it to retrace its own path to the diffracting mirror 14b. At the surface of the mirror 14b, most of the beam undergoes specular reflection and comes ultimately to focus at the exit orifice 40. As depicted in FIG. 5, the exit orifice 40 comprises a plurality of diaphragms 42, each having a very small hole therein. This is one of the features of this embodiment of the invention, since the focusing of the exit beam 21c at a point within the exit orifice 40 permits use of very small holes so that a windowless exit orifice is possible. In turn, this is advantageous in a gas laser of the flowing type or in a low-pressure gas laser wherein continuous pumping of the laser medium is desired.

The configuration of the diffracting mirror 14b in the embodiment of FIG. 5, as shown in FIG. 6, consists of a system of concentric, circular troughs 44 and peaks 46. The center of curvature of the pattern of FIG. 6 is located in the plane of the mirror at a point (C) determined by a line 48 that is perpendicular to the plane of the mirror 14b and passes through the desired focal point at the exit orifice 40. The radial pattern of surface depth modulations of the wave is given by an amplitude function as follows:

$$s = D/2 \cos [(2\pi/\lambda) \sqrt{Z^2 + r^2}],$$

wherein $r$ is the radial distance from point C in the plane of the mirror, $Z$ is the distance between the focal point at the exit orifice 40 and the point C, and $D$ is the full depth of the modulation.

In the embodiments of the present invention described hereinbefore with respect to FIGS. 1-6, specular reflection from the diffracting mirror is used to sustain the resonance while diffraction is used to provide the output beam or beams. However, in some applications, it may be advantageous to interchange the roles of the specular beam and the diffracted beam, as illustrated in the embodiment of FIG. 7. Therein, the diffracting mirror 14c is in a plane at an angle $\theta$ with respect to the optical axis of the concave spherical mirror 12 such that:

$$\sin \theta = \lambda/2P,$$

wherein $P$ is the period of the grating undulation. The so-called zero-order component of the diffracted beam, which is the specular reflection, provides the output beam 18d, whereas resonance is sustained by the first order diffracted beam 20d in the backward direction, which is coaxial with the incident beam. No other diffracted beams are desirable and none will appear if the value of $\sin \theta$ exceeds ⅓. This means that $\theta$ should preferably exceed 19.47° and P should be less than 1.5 wavelengths. Otherwise, a first-order beam will appear in the forward direction at an angle whose sine is equal to $3 \sin \theta$, and the second-order backward-diffracted beam will appear at an angle whose sine is $-3 \sin \theta$. An important application of zeroeth-order coupling of power from a laser cavity may occur when the total gain of the laser medium approaches or exceeds about 70 percent, so that less than 50 percent feedback is required to sustain oscillation.

The diffracting mirrors described hereinbefore with respect to the embodiments of FIGs. 1–7 have all involved planar mirrors, but other forms of mirrors, such as spherical and cylindrical mirrors, may also be used as diffracting mirrors when suitable modulation patterns are formed thereon. When the diffracting mirror surfaces curve, the analytical description of the surface modulation pattern may become extremely complicated, but the basic principles of design and operation remain the same.

The surface modulation patterns for the diffracting mirrors in the above-described embodiments can be produced in various ways such as by evaporating additional metal onto the surface of a metallic mirror, or by etching away some of the metal from the surface of a metallic mirror. A dielectric material such as zinc sulfide or patented material called "cryolite" can also be used to form the relief pattern upon the surface of the mirror, but the variation in thickness required in a dielectric coating is much greater than the variation in thickness required in corresponding metallic surface patterns. Moreover, dielectric coatings generally have a greater loss and a poorer heat conductivity, which gives rise to problems in mirror heating and optical losses. Thus metallic surfaces are therefore preferred.

Additionally, the above-described coupling mirrors are equally applicable to rotating and/or translating mirror systems which may be used for laser mode and frequency control, for Q switching for bursts of output power, or for controlling the intensity or direction of the beam output.

Furthermore, it is possible to utilize acoustic modulation to provide the diffracting characteristic for the diffraction mirror surface, by the use of an acoustic transponder and a compliant mirror material to establish standing or travelling waves of surface amplitude to achieve the desired degree of diffraction. The control of acoustic frequency or wavelength affords a direct and precise control over the angle of the diffracted beams, and in this way a controlled variation of various beam parameters, such as direction and amplitude, may be achieved. In a similar way, variation in the amplitude of the surface distortion may be used as a continuously variable control of the coupling coefficient, and thereby the Q of the resonant cavity and the associated output power.

Although the laser medium 10 is depicted in all embodiments herein as a tube with Brewster flats, it may in fact be a gas filling the entire chamber (32), or may take any other known suitable form.

Although the invention has been shown and described with respect to preferred embodiments thereof, it should be obvious to those skilled in the art that the foregoing and various other changes and omissions in the form and detail thereof may be made therein without departing from the spirit and the scope of the invention.

Having thus described typical embodiments of our invention, that which we claim as new and desire to secure by Letters Patent of the United States is:

1. A laser comprising a laser cavity having an optical axis and having a laser gain medium disposed in said laser cavity, said laser cavity including:
   a generally planar mirror having a diffraction grating surface thereon in the form of a Fresnel zone pattern with focal properties such that one of the first order diffracted beams is a convergent beam focused at some desired point external of the laser cavity;
   a first concave mirror facing said planar mirror, both of said mirrors aligned with the optical axis of said laser cavity; and
   a second concave mirror located at a distance from said generally planar mirror on the axis of the divergent first order diffracted beam from said Fresnel zone pattern and having a focal length and orientation such that the rays of said divergent beam are all reflected upon themselves, causing the reflected beam to retrace its path to the diffracting mirror and, after reflection at that mirror, to emerge coincident with said convergent diffracted beam.

2. A laser according to claim 1 having a capillary orifice disposed coaxially with said coincident focused beams at the focal point thereof designed to support a pressure differential without having a window.